Figure 1:
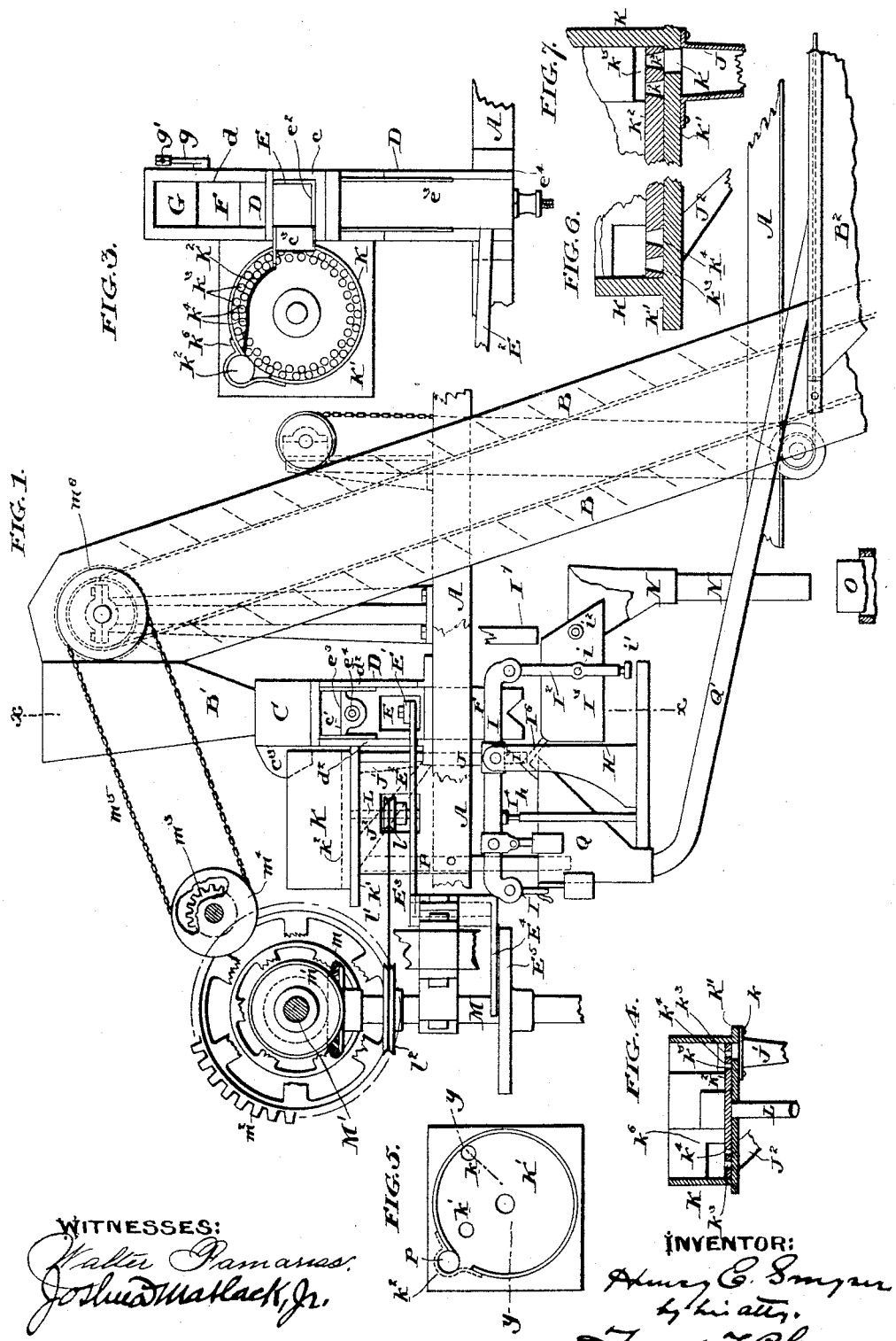

(No Model.) 2 Sheets—Sheet 1.

H. E. SMYSER.
AUTOMATIC WEIGHING MACHINE.

No. 449,276. Patented Mar. 31, 1891.

WITNESSES:

INVENTOR:

(No Model.) 2 Sheets—Sheet 2.

H. E. SMYSER.
AUTOMATIC WEIGHING MACHINE.

No. 449,276. Patented Mar. 31, 1891.

WITNESSES:

INVENTOR:

UNITED STATES PATENT OFFICE.

HENRY E. SMYSER, OF PHILADELPHIA, PENNSYLVANIA.

AUTOMATIC WEIGHING-MACHINE.

SPECIFICATION forming part of Letters Patent No. 449,276, dated March 31, 1891.

Application filed August 5, 1890. Serial No. 361,073. (No model.)

*To all whom it may concern:*

Be it known that I, HENRY E. SMYSER, of the city and county of Philadelphia, State of Pennsylvania, have invented a certain new and useful Improvement in Automatic Weighing-Machines, of which the following is a true and exact description, reference being had to the accompanying drawings, which form a part of this specification.

My invention relates to the construction of mechanism intended to automatically measure and deliver weighed quantities of granulated, pulverized, or similar material, and has for its object to generally improve the character and mode of operation of such mechanism.

So far as I am aware, machines of this character heretofore constructed have operated in one of two ways—that is to say, either by measuring a definite bulk of the substance or by feeding the substance from a hopper into a scale pan or pans and causing the movement of the scale-beam to shut off the supply when the desired weight has been fed into the pan. Large numbers of machines have been devised and constructed which operate upon one of the two methods described, and many different mechanical constructions are known in the art for effecting the measurement of bulk and for regulating the delivery of the material through a chute to a scale-pan by the position of the scale or connected parts of the machine. It is of course difficult and in many cases impossible to obtain quantities of uniform weight by merely measuring their bulk, and in the devices which operate by the delivery of the substance to be weighed into the scale-pan it is found difficult to obtain accurately-weighed quantities, except by feeding the material to the scale-pan so slowly as to seriously interfere with the commercial value of such apparatus.

I have succeeded in devising a method of operation and construction of machine in which the advantages of the two classes of machines above referred to are combined, so that the scale-pans are filled at once rapidly and accurately.

My new method of filling the scales of automatic weighing-machines consists in measuring off quantities of material of less weight than the desired scale charge, dumping said measured charges into the scale-pans, and then feeding the scale-pans with a gradual additional supply of the material to be weighed until the desired weight is attained. The gradual additional supply fed into the scale-pan after it has received its measured charge can be cut off when the full weight is obtained by any of the well-known devices for controlling the delivery into the scale-pan by the position of the said pan or its scale-beam. I prefer to use the devices described by me in my patent granted January 17, 1888, and numbered 376,683.

In the drawings I have illustrated a machine adapted to carry out my improved method and showing certain essential combinations of mechanism and certain preferred details of construction, which also form the subject-matter of this specification and are intended to be protected thereby. The nature of these improvements will be best understood as described in connection with the drawings, in which—

Figure 2:
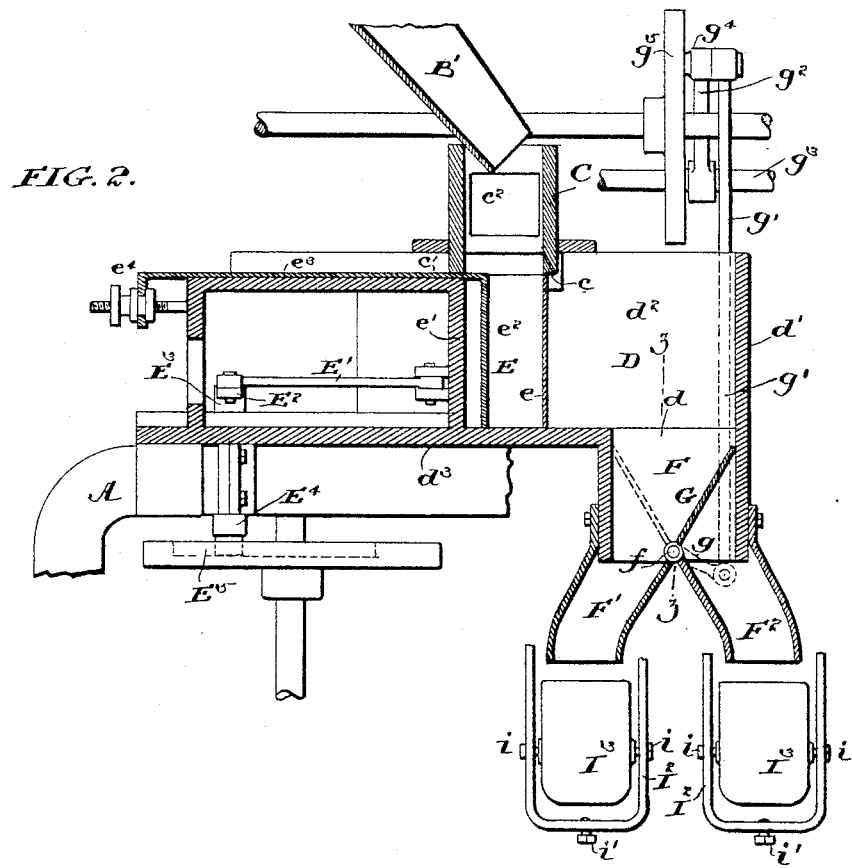
Figure 8:
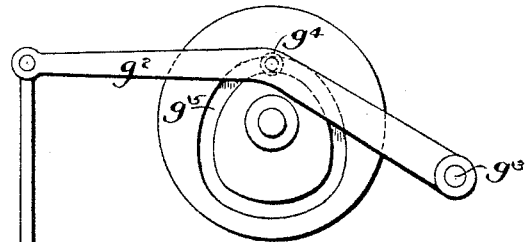

Figure 1 is a side elevation of the device; Fig. 2, a cross-sectional view taken on the line $x$ $x$ of Fig. 1; Fig. 3, a plan view showing a portion of the apparatus; Fig. 4, a cross-section through the hopper, (marked K,) taken on the line $y$ $y$ of Fig. 5; Fig. 5, a plan view of hopper K with its false bottom removed; Figs. 6 and 7, enlarged views of the opposite ends of the sectional view shown in Fig. 4, and Fig. 8 a sectional view taken on the line $z$ $z$ of Fig. 2.

A A, &c., indicate portions of the framing of the machine.

B is an elevator leading from a supply-receptacle $B^2$ to a hopper or chute $B'$. This hopper or chute $B'$ opens into an open-ended chute or box C, which rests upon the top of the walls $d^2$ of a box D. Flanges or extensions $c$ and $c'$ of box C extend down between the walls $d^2$ of box D and coact with a measuring-box in the way hereinafter described. An opening $c^2$ is formed in one side of the box C above the top of the walls $d^2$, and a chute $c^3$ leads from said opening to a hopper K. The box D, above referred to, has a bottom consisting of the platform $d^3$, in which is formed an opening $d$. As shown, it is also provided with an end plate $d'$, the other end of the box being opened.

E is a measuring-box, which fits in the box

D and rests upon the bottom $d^3$ thereof. This measuring-box is given a reciprocating motion from a point beneath the chute-box C to a point over the opening $d$ in the platform $d^3$. Its height is such that its top edge will approach close to the depending flanges $c$ and $c'$ of the box C. As shown, the box E is made adjustable in area by means of the sliding plate $e^2$, placed between its permanent back and front faces $e$ and $e'$ and connected by means of an extension-plate $e^3$ with an adjusting-screw $e^4$, which is attached to a back extension of the box, as shown. The desired rociprocating motion is given to the box E by means of the connecting-rod E', lever $E^2$, rock-shaft $E^3$, lever $E^4$, and revolving cam $E^5$, a roller at the end of arm $E^4$ fitting in the cam-groove.

The operation of the parts above described is obvious. The elevator B raises the grain or other substance to be measured and dumps it into the hopper B', which delivers it into the hopper-box C, from which box the grain falls into the box E when it is in the position shown in Fig. 2. The box E, being filled, is by means of the cam $E^5$ and the mechanism above described pushed forward in box D until it comes over the opening $d$, through which its contents fall into a receptacle or receptacles arranged below said opening. The depending flange $c$ of box C smooths off the material on top of the box E, permitting it to take a full load, but no more, from beneath the box C. As the box E slides forward the plate $e^3$ closes the bottom of the chute-box C, and a portion of the grain, falling into said box, then passes out through its side opening $c^2$ and through chute $c^3$ into the hopper K. The height of the opening $c^2$ will be regulated so as to permit a certain accumulation of the material at the bottom of box C, which accumulation is at once dumped into the box E, when it again returns to the position shown in Fig. 2.

In communication with and beneath the opening $d$ I place a chute or a series of chutes arranged to deliver the contents of the box E into scale-pans placed beneath them. I prefer to arrange the apparatus with a number of scale-pans and branch chutes leading thereto, and to arrange an intermittently-moving deflector so that it will deliver the material dumped from the box E *seriatim* to the different scale-pans.

As shown in the drawings, a chute F is placed immediately beneath the opening $d$, said chute having two branches F' and $F^2$ coming together at a point $f$. At this point I pivot a deflector-plate G, which is connected with a cam $g^5$ by means of lever $g$, connecting-rod $g'$, and lever $g^2$, which is pivoted at $g^3$ and provided with a cam-roller $g^4$, working in the groove of cam $g^5$. The operation of this cam is to turn the deflecting-plate G first to one side and then to the other, each motion corresponding with the forward motion of the box E, so that its contents pass alternately to the branch chutes F' and $F^2$. Beneath each of these branch chutes are scale-pans $I^3$ $I^3$, which pans and their immediate connections are, as shown, constructed like my before-mentioned prior patent of January 17, 1888. The scale-beams I are pivoted on a standard H, weights I', fastened to one end of the scale-beam, and a yoke $I^2$, pivoted at the other end, the scale-pan $I^3$ being pivoted to said yoke at $i$.

$i'$ is an adjustable stop which regulates the amount of downward motion of the scale-pan, and $i^2$ a projecting pin by which the scale-pan is dumped, the dumping being accomplished by the downward motion of a rod $I^7$ coming in contact with a pin $i^2$ and turning the scale-pan on its pivot $i$. In the drawings I have only shown the end of the rod $I^7$. A regulated intermittent up-and-down motion can be given to this rod in any convenient way or by any simple connections, and I have not thought it necessary to obscure the drawings by showing any particular mechanism for moving the rod.

$I^4$ is a stop which regulates the upward motion and highest position of the scale-pan; $I^5$, a small chute secured to and turning with the pivot-rod of the scale-beam, and $I^6$ a little double chute secured to standard H beneath the end of spout $I^5$, one branch leading into the scale-pan and the other into a hopper Q.

J is a spout leading to the funnel-shaped mouth-piece of the small spout or chute $I^5$, one such spout being of course provided for each scale-pan.

J' $J^2$ are chutes leading from the bottom of the hopper K into the chutes J, which really form a continuation of them.

K is a hopper which, as shown, receives its supply from the box C in the manner above described. The bottom of this hopper is pierced with holes, which connect with the chutes J' and $J^2$. Preferably I form the box with one hole for each chute and place the holes (indicated by the letters $k$ and $k'$) at different distances from the center of the box or hopper. The hopper is cylindrical in form, but has a small extension from one side, in which a perforation $k^2$ is formed, said perforation communicating with a chute P.

Upon the bottom K' of the hopper K, I place what I may call a "false bottom" $K^2$, secured to a shaft L, which is given a rotating movement from the shaft M by means of the pulleys $l$ and $l^2$ and the belt $l'$. This false bottom is provided with annular rows of perforations $k^3$ and $k^4$, the perforations $k^3$ registering with the perforations $k$ in the hopper-bottom and the perforations $k^4$ registering with the perforations $k'$. A stationary brush $k^5$ is arranged to sweep over the perforations $k^3$ and $k^4$ as the false bottom $k^2$ revolves, thus preventing clogging in said perforations. Any excessive supply reaching the hopper K passes out through the perforations $k^2$ into spout P. A deflecting-plate $k^6$ is preferably arranged to direct the surplus accumulating on the top of the false bottom into this escape perforation, As shown, the chute P leads into the hopper Q and the hopper Q delivers any material falling in it through chute Q' to the receptacle B². Grains or particles of the material fed into the box K enter the openings $k^3$ and $k^4$ in the revolving bottom $k^2$ and are carried along by said bottom until they come over the openings $k$ and $k'$, through which they fall into the chutes J' or J², which carry them to the little spouts or chutes I⁵, depending from the scale-beams I. When the scales are in the position shown in Fig. 1, the material passing through the spout I⁵ falls on the side of the chute I⁶, leading into the scale-pan I⁸, and when the weight of the scale-pan is such as to overcome the weights I' the chute turns with the scale-beam, so that its contents fall on the other side of the chute I and are directed into the hopper Q. In this way a very gradual supply of material is fed into the scale-pan, which has previously had the contents of the box E dumped into it, the box E being gaged to hold a quantity less than the desired weight, but closely approaching to it. It takes but a small amount of additional material from the hopper K to complete the desired weight, and this quantity, although supplied gradually, does not require long in delivering. I therefore obtain both quickly and accurately the weighed quantity in the scale-pan, which is then dumped by the reciprocating rod I⁷ into the hopper N, the spout N' of which leads the material to a package O.

In place of using the device shown and previously patented by me for effecting the cut-off of supply to a scale-pan by means of the movement of said pan or its scale-beam, I can of course employ any of the many well-known devices used for similar purposes, and where the device shown is used it will be noticed that the double chute I⁶, while a convenient, is not an essential, device, as the little spout I⁵ may be made to deliver directly into the scale-pan or directly behind the same.

Having now described my invention, what I claim as new, and desire to secure by Letters Patent, is—

1. In an automatic weighing-machine, the combination, with a scale pan or pans, of a measure adapted to receive a measured and uniform bulk of material and positively-actuated mechanism acting to fill said measure and dump the same at intervals into the pan or pans, substantially as and for the purpose specified.

2. In an automatic weighing-machine, the combination, with a scale pan or pans, of a measure adapted to receive a quantity of the material to be weighed and dump it into the pan or pans, and an independently-supplied chute or chutes leading into the pan or pans, the delivery of which is controlled by the position of the scale, all substantially as and for the purpose specified.

3. In an automatic weighing-machine, a measure adapted to alternately receive and deliver measured quantities of the material to be weighed, a hopper arranged to receive the contents of the measure and having two or more delivery-chutes, a deflector arranged in the hopper and adapted to open each delivery-chute in turn, and a series of scales situated beneath the delivery-chutes so as to receive material therefrom, all substantially as and for the purpose specified.

4. In an automatic weighing-machine, a measure adapted to alternately receive and deliver measured quantities of the material to be weighed, a hopper arranged to receive the contents of the measure and having two or more delivery-chutes, a deflector arranged in the hopper and adapted to open each delivery-chute in turn, a series of scales situated beneath the delivery-chutes so as to receive material therefrom, and independent chutes leading to each scale from a supply-hopper, the delivery of which is regulated by the position of the scale-beam.

5. In an automatic weighing-machine, the combination, with a platform $d^3$, having an opening $d$, of a reciprocating measure E, means for filling said measure, and a scale or scales situated beneath the opening $d$, and means for directing the contents of the measure into said pan or pans, all substantially as and for the purpose specified.

6. In an automatic weighing-machine, a hopper-box, as K, having one or more perforations in its bottom, in combination with a revolving false bottom having a series of disconnected perforations arranged to register with the hole or holes in the true bottom, a chute or chutes arranged to receive the material fed through the hopper-bottom, and a scale or scales arranged at the delivery end of said chutes.

7. In an automatic weighing-machine, a hopper-box, as K, having two or more perforations through its bottom at varying distances from its center, in combination with a revolving false bottom having two or more series of perforations adapted to register with the holes in the hopper-bottom, a series of receiving-chutes, and a series of scales adapted to receive the contents of said chutes and adapted, as specified, to cut off the delivery by the movement of the scale-beams.

H. E. SMYSER.

Witnesses:
 LISLE STOKES,
 JOSHUA MATLACK, Jr.